Oct. 5, 1937.    E. H. SWAN    2,094,932
MEANS FOR SCREENING ROOF VENTILATION APERTURES IN MOTOR CARS
Filed July 13, 1936    2 Sheets-Sheet 1
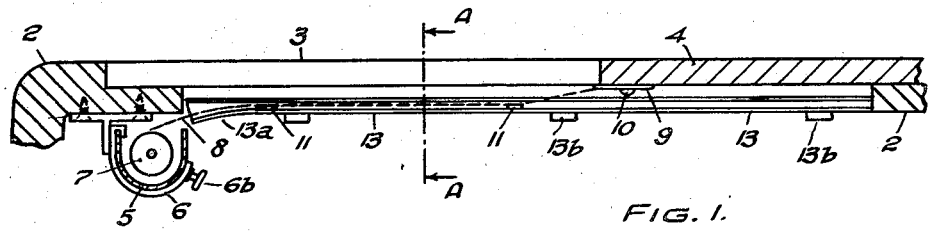
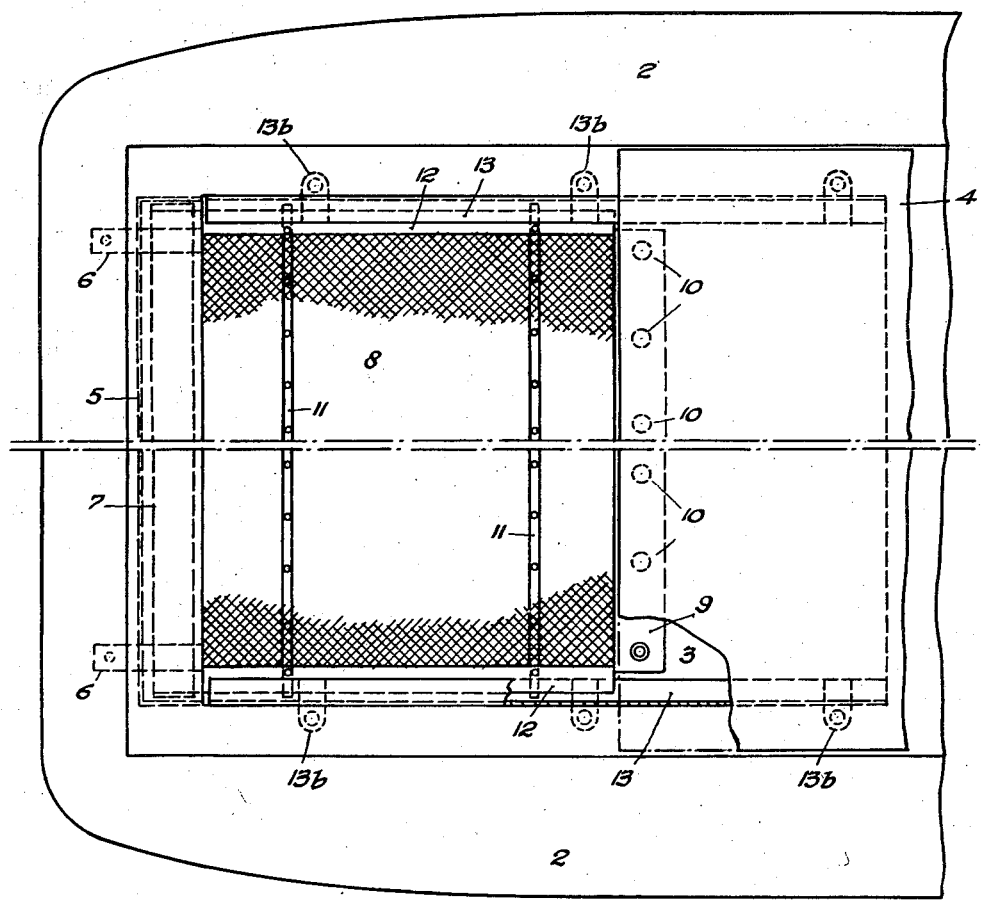
INVENTOR
E. H. SWAN Oct. 5, 1937.  E. H. SWAN  2,094,932
MEANS FOR SCREENING ROOF VENTILATION APERTURES IN MOTOR CARS
Filed July 13, 1936  2 Sheets-Sheet 2
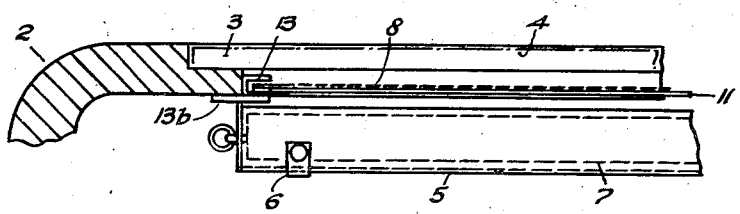
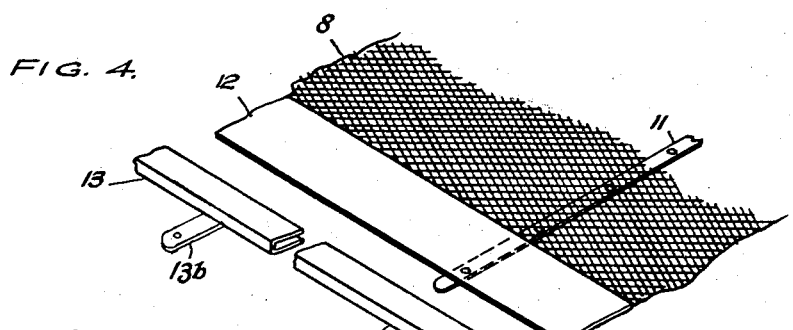
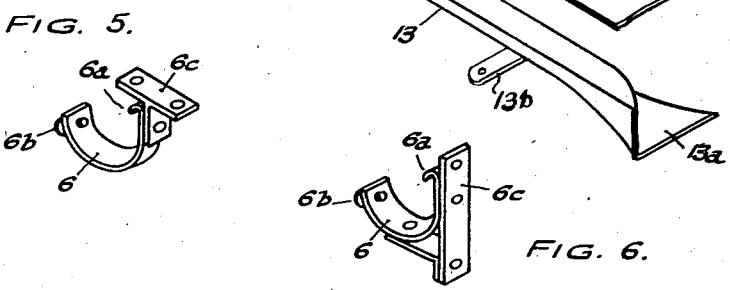
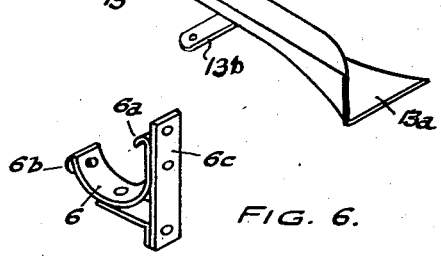
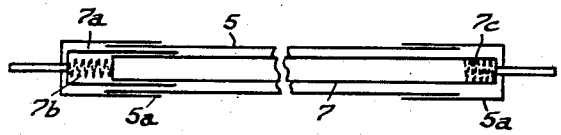
INVENTOR —
E. H. SWAN.

Patented Oct. 5, 1937

2,094,932

UNITED STATES PATENT OFFICE 2,094,932

MEANS FOR SCREENING ROOF VENTILATION APERTURES IN MOTOR CARS

Eric Hargreaves Swan, New Ferry, England

Application July 13, 1936, Serial No. 90,416
In Great Britain August 20, 1935

3 Claims. (Cl. 156—39)

When the sliding roof or other type of opening roof of a saloon motor car is open insects, litter and other extraneous matter are very liable to be blown through the roof aperture into the interior of the car to the inconvenience of the occupants, and the object of the present invention is to provide improved means for screening the roof aperture when the sliding or other roof is open so as to exclude this extraneous matter without interfering with the free ventilation through the aperture.

For this purpose according to the present invention the roof aperture is covered by a mesh or like screen wound upon a roller and detachably secured at its free end to the sliding or other opening part of the roof, so that the screen may be adjusted to different degrees of opening in the roof or be detached to provide an unrestricted opening. Alternatively, the roller may be fitted on the roof closure and the free end of the screen detachably secured to the roof.

The roof aperture in saloon cars is commonly disposed at the front of the roof, and is adapted to be closed or adjusted in size by means of a sliding panel movable in the direction of the length of the car. With this arrangement, according to one embodiment of the invention, the screen may consist of a length of close-mesh fabric or gauze netting of a width corresponding to that of the roof aperture, and the mesh screen is wound upon a spring-loaded roller housed within a sheet metal or other casing secured by means of lugs at its ends across the front end of the roof aperture slightly below the level of the sliding roof panel. A series of light stiffening ribs of metal are fitted at spaced intervals across the screen, and the ends engage in guide channels at the sides of the roof aperture so as to prevent the screen from sagging. Reinforcing strips of leather, leatherette, or textile material are preferably provided at the sides and at the free end of the screen. Press fastenings serve detachably to secure the free end of the screen to the sliding roof panel.

The invention is illustrated by way of example in the accompanying drawings, in which:—

Fig. 1 is a sectional side elevation through the roof aperture of a saloon car;

Fig. 2 is a broken plan view of the roof;

Fig. 3 is a broken transverse section through the roof on A—A of Fig. 1;

Fig. 4 is a detail perspective view of a portion of the mesh screen and one of the guide channels therefor;

Figs. 5 and 6 are two forms of clips for securing the roller casing to the roof; and Fig. 7 is a diagrammatic view of a roller and casing construction adjustable for various widths of roof apertures.

The vehicle roof 2 is provided in known manner with a top rectangular aperture 3 disposed at the front of the roof and closable by slidable panel 4 movable in the direction of the length of the vehicle. Across the front of the aperture is fitted a sheet metal casing 5 of substantially U section secured to the underside of the roof by means of brackets 6, and housed within the casing is a roller 7 upon which is wound a mesh screen 8 of a width corresponding substantially to the width of the roof aperture. The screen is preferably made from a length of close-mesh fabric or gauze netting; flexible wire mesh material may, however, be employed alternatively.

The mesh screen is drawn through the top of the casing to span the roof aperture, and its free end, to which is fixed a flexible reinforcing strip 9 of leather or leatherette, which may have a stiffening insert along its length, is detachably secured to the forward end of the sliding roof panel 4 by means of press stud fastenings 10. A series of light transverse metal stiffening ribs 11 are fixed at spaced intervals to and under the mesh screen, and the ends project beyond the edges of the screen, which are reinforced with binding 12, to engage in channel-section guides 13 fixed to the car roof at each side of the roof aperture by means of lugs 13b. The channel guides 13 are made somewhat wide to accommodate and support the bound edges of the screen so as to prevent sagging and completely enclose the roof opening. Preferably, as indicated in Fig. 4 the entrant ends of the guides are flared inwardly and downwardly at 13a to provide a support for the screen as it is drawn on to and from the roller.

The screen-carrying roller 7 is spring loaded to maintain the screen taut, and will consequently automatically adjust the screen to different sizes of roof apertures, the screen winding on or off the roller after the manner of a roller blind in accordance with the position to which the sliding panel 4 is adjusted. When it is desired to have an unrestricted roof aperture, the free end of the mesh screen is released from the sliding roof panel by detaching the press fastenings 10, and the screen will then automatically be drawn into the roller casing clear of the roof aperture.

In order to render the screen adjustable for roof apertures of different widths, the binding 12 at the sides of the screen may be made in the form of wide bands, as indicated in Fig. 4, the width of the screen with its two side bands being such as to span the full width of the widest aperture to be covered, and the edges of the bands being trimmed by cutting to suit the width of smaller apertures, the lengths of the transverse ribs 11 being correspondingly reduced. For the same purpose the length of the roller and its casing 5 may also be made adjustable. In the construction shown diagrammatically in Fig. 7, the roller 7 and the casing 5 are both of telescopic form. The casing is built up from a main element 5 and two telescopic end pieces 5a, the end pieces being adjusted endwise on the casing to suit the width of the roof aperture and then being fixed to the casing 5 as by soldering. The roller is formed in a similar manner from a roller 7 fitted with a telescopic tubular end piece 7a, which is held in the adjusted position either by soldering, or by means of an internal compression spring 7b resiliently holding the two portions of the roller in abutting engagement with the end walls of the casing, the ordinary roller spring 7c being fitted at the other end of the roller.

Two forms of securing brackets 6 for the roller casing 5 are indicated in Figs. 5 and 6, each comprising a stirrup portion having at one end a lip 6a for engaging a top longitudinal edge of the casing and at the other end a set screw 6b, the brackets being secured in position by lugs 6c apertured to receive retaining screws, the lugs being either horizontally disposed (Figs. 1, 2, 3, and 5) for fitting to the underside of the roof, or vertically disposed (Fig. 6) where the roller casing is fitted to the horizontal portion of the body above the vehicle windscreen.

If desired, the positions of the roller and the screen end attachment may be reversed, the roller and its casing being fitted on the sliding roof panel and the free end of the mesh screen being detachably secured to the fixed portion of the roof.

Such a screen cover to the roof aperture in a saloon car will effectively prevent the ingress of insects and litter into the interior, and will at the same time afford a protection against the sun and strong draughts, without in any way interfering with the free ventilation provided by the open roof; while the press buttons or other detachable fastenings enable the screen to be dispensed with when an unrestricted roof opening is desired. The screen may also be utilized as a wireless aerial, the metal of the screen being employed in the case of a wire-mesh screen, or an aerial wire being incorporated in a screen made from textile gauze, or similar material.

I claim:—

1. In combination with a roof element having an opening and a sliding closure element for said opening, a roller mounted on one of said elements, a screen wound on said roller and connected at its free end to the other of said elements, supports for the side edge portions of the screen carried by the roof elements at the sides of the opening therein, and screen supports extending transversely across the screen at spaced intervals along the length thereof and supported at their ends by said supports, whereby the screen is supported against sagging and against becoming disengaged at its side edges from said supports.

2. The combination as set forth in claim 1 including bindings for the side edges of the screen to be cut to reduce the width of the screen, and further including a roller composed of telescopic sections whereby it may be varied in length in accordance with variations in the width of the screen.

3. The combination as set forth in claim 1 including separable fastener members on the free end of the screen and on the element to which the free end of the screen is connected, respectively, for separably connecting the said free end of the screen to said element.

ERIC HARGREAVES SWAN.